United States Patent [19]

Meur

[11] Patent Number: 5,486,973
[45] Date of Patent: Jan. 23, 1996

[54] POSTAGE METER INCLUDING A SAFETY LOCKING CIRCUIT

[75] Inventor: Jean-Pierre Meur, La Ville Du Bois, France

[73] Assignee: Neopost Industrie, Bagneux, France

[21] Appl. No.: 306,330

[22] Filed: Sep. 15, 1994

[30] Foreign Application Priority Data

Sep. 24, 1993 [FR] France .................... 93 11395

[51] Int. Cl.⁶ .................... H02M 3/335; G07B 17/00; H01H 13/18
[52] U.S. Cl. .................... 361/170; 363/124; 200/50 A; 307/328
[58] Field of Search .................... 200/50 A, 61.58 R, 200/61.62, 61.7, 61.76, 61.71; 363/21, 56, 20, 124, 97, 74, 100, 131; 361/170, 179; 307/326, 328, 116, 134

[56] References Cited

U.S. PATENT DOCUMENTS

| 4,421,977 | 12/1983 | Kittredge . | |
|---|---|---|---|
| 4,455,462 | 6/1984 | DeLucia | 200/61.62 |
| 4,910,634 | 3/1990 | Pipkorn | 361/147 |
| 5,077,631 | 12/1991 | Cleary | 361/192 |
| 5,237,140 | 8/1993 | Akazawa et al. | 363/15 X |

FOREIGN PATENT DOCUMENTS

| 0086396A3 | 8/1983 | European Pat. Off. . |
|---|---|---|
| 0099571A3 | 2/1984 | European Pat. Off. . |
| 0432603A2 | 6/1991 | European Pat. Off. . |
| 0484610A1 | 5/1992 | European Pat. Off. . |

OTHER PUBLICATIONS

French Search Report FR 9311395, 8 Jun., 1994.

*Primary Examiner*—A. D. Pellinen
*Assistant Examiner*—Fritz M. Fleming
*Attorney, Agent, or Firm*—Sughrue, Mion, Zinn, Macpeak & Seas

[57] ABSTRACT

A mail-processing machine including an electrical power supply for powering at least one control motor, and a safety locking circuit electrically connected to a cover switch of the machine and co-operating with the electrical power supply to switch the power supply off whenever the cover of the machine is open. The machine includes a chopper electrical power supply comprising at least one power chopper circuit having a control circuit. The safety locking circuit includes at least one electromechanical relay electrically connecting the power chopper circuit to its control circuit, and constituting an integrated on/off mechanism that is approved, cheap, and very compact.

5 Claims, 1 Drawing Sheet

POSTAGE METER INCLUDING A SAFETY LOCKING CIRCUIT

FIELD OF THE INVENTION

The invention relates to a mail-processing machine including an electrical power supply for powering at least one control motor, and a safety locking circuit electrically connected to a cover switch of the machine and co-operating with the electrical power supply to switch the power supply off whenever the cover of the machine is open.

BACKGROUND OF THE INVENTION

Mail-processing machines such as postage meters are now in common use in firms and in post offices.

Postage meter manufacturers are seeking to make postage meters increasingly sophisticated to satisfy the needs of users of such machines. In particular, a concern of manufacturers is to make machines that offer a large number of features to users.

Increasing the number of features or control functions offered by a postage meter involves increasing the number of control motors required to implement such features. In general, such motors are DC motors.

Currently, such control motors are powered by a DC electrical power supply of a conventional type comprising a rectifier, a primary circuit and a secondary circuit. To satisfy the above-mentioned needs of users, it is therefore necessary to provide a DC power supply that is adapted to supplying high enough energy to all of the control motors. As a result, the greater the number of control motors to be served, the heavier and bulkier such a DC power supply becomes.

Furthermore, postage meters must be approved before they can be put into service. Such approval involves the presence of a safety locking circuit connected to a cover switch of the machine and co-operating with the electrical power supply. The function of the safety locking circuit is to switch the electrical power supply off whenever the cover of the machine is open. Certain regions of the machine that are accessible to an operator whenever the cover is open might be potential sources of mechanical and electrical danger.

Currently, a circuit approved under UL, CSA, and BSI standards consists of an electromechanical device, such as a switch or a relay, which is itself approved, and which is wired in series with the power supply. It may be situated upstream from, downstream from, or within the power supply. The increase in the number of control motors then means that the electromechanical component used must be bulky and costly because it needs to have a high current-interrupting capability.

Postage meter users expect postage meter manufacturers to produce postage meters that are as compact as possible so that they can be used as office equipment.

OBJECTS AND SUMMARY OF THE INVENTION

An object of the invention is to provide a mail-processing machine, such as a postage meter, including an electrical power supply that is capable of serving a large of number of control motors mounted inside said machine, and a safety locking circuit satisfying approval conditions and requiring no other external electromechanical component, with the machine retaining a degree of compactness that is compatible with user expectations.

To this end, the invention provides a mail-processing machine including a chopper electrical power supply comprising at least one power chopper circuit having a control circuit, and wherein the safety locking circuit includes at least one electromechanical relay electrically connecting the power chopper circuit to its control circuit, and constituting an approved integrated on/off mechanism.

Chopper electrical power supplies are well known. They procure a significant saving in weight and a significant gain in compactness compared with electrical power supplies conventionally used in postage meters. A feedforward-type power supply is particularly well suited to such mail-processing machines because it can deliver an output power of up to 400 W, enabling it to serve a substantial number of electric motors operating at low voltage, about 24 V, at power levels lying in the range 16 W to 100 W.

The electromechanical relay can be chosen to have a low current-interrupting capability, and to constitute an optimum compactness/cheapness compromise for interrupting the electrical power supply. Furthermore, a postage meter equipped with such a safety locking circuit satisfies approval conditions.

Moreover, this solution makes it possible to avoid having to add on external components, such as switches or relays, for controlling the drive motors.

BRIEF DESCRIPTION OF THE DRAWING

The invention is described in detail below with reference to the accompanying drawing, in which.

MORE DETAILED DESCRIPTION

Figure 1:
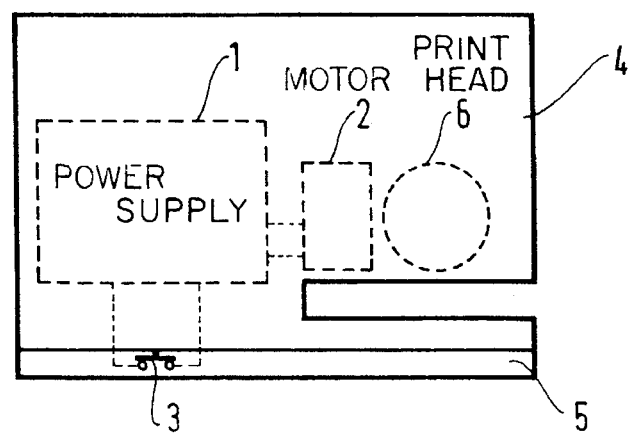
FIG. 1 is a diagram showing a postage meter equipped with a power supply and with a safety locking circuit in accordance with the invention.

FIG. 1 shows a postage meter equipped with an electrical power supply 1 organized so as to be connected to mains and serving one or more control motors for controlling the machine, a single motor 2 being shown. For example, motor 2 serves to drive the print head 6 of the postage meter. The postage meter also includes a switch 3 serving to interrupt the electrical power supply when the cover 4 of the postage meter is lifted off from the base 5 of the postage meter.

Figure 2:
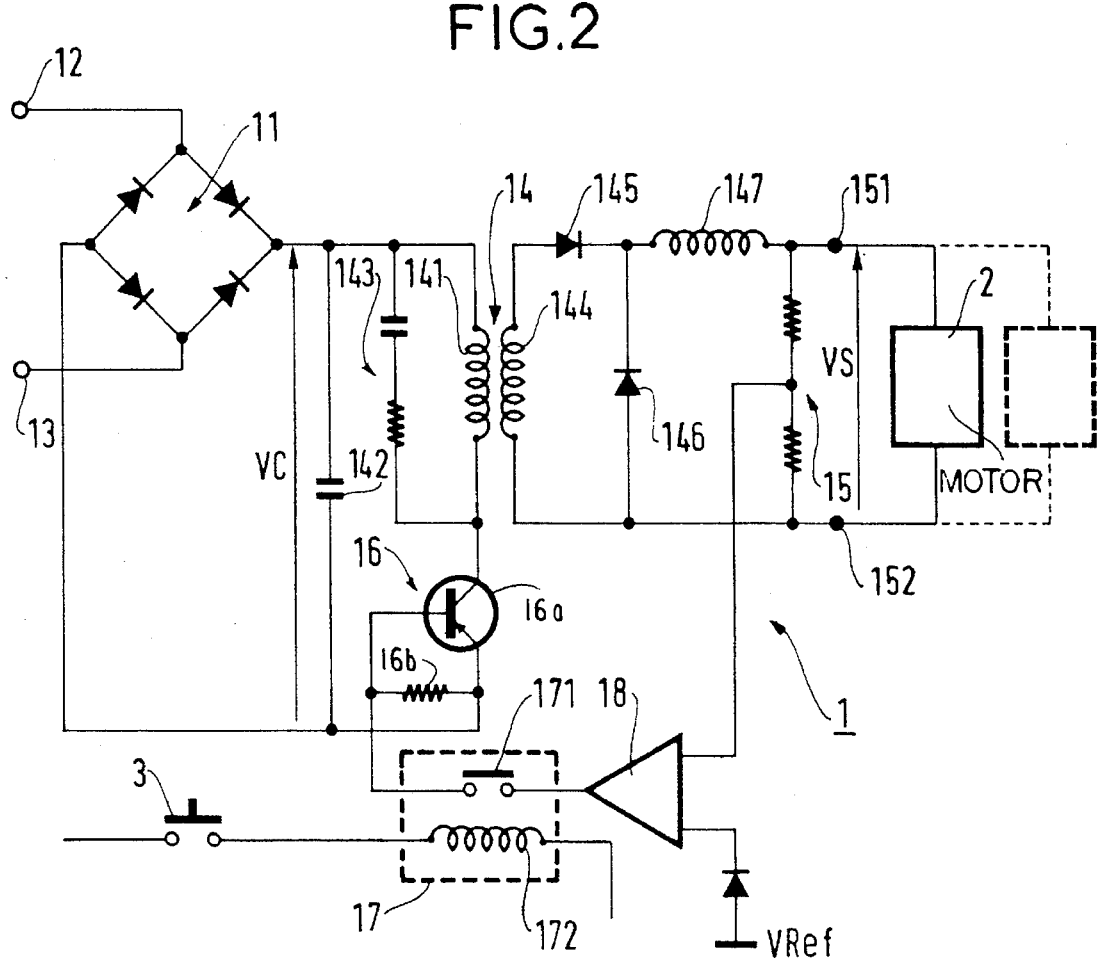
FIG. 2 shows the power supply and the safety locking circuit in more detail.

The electrical power supply shown in FIG. 2 is of the feedforward type. It comprises a diode bridge 11 having inputs 12, 13 that are organized so as to be connected to the electricity mains. The function of the diode bridge is to rectify the alternating current supplied by the electricity mains into direct current. The outputs of the diode bridge are connected to a transformer 14 having a primary winding 141 equipped with a filtering capacitor 142, and an RC section 143, a secondary winding 144 provided with two rectifying diodes 145 and 146, and with a voltage-smoothing choke 147. The secondary winding is followed by a divider bridge 15. The control motor(s) 2 are connected in parallel to the terminals 151, 152 of the divider bridge.

The transformer is also provided with a power chopper circuit 16 constituted by a transistor 16a and by a resistor 16b. The base of the transistor 16a is connected to one terminal of a contact 171 of an electromagnetic relay 17, while the other terminal of the contact of the relay is connected to the output of an amplifier 18 serving as a control circuit for the power chopper circuit. The amplifier 18 receives a reference voltage VRef at one of its inputs and a voltage coming from the divider bridge 15 at its other input.

The relay 17 includes a control coil 172 which acts on the contact 171 to open or to close the line between the amplifier 18 and the power chopper circuit 16. The control coil 172 is connected in series with the cover switch 3 in an electrical circuit including an auxiliary electrical power supply (not shown).

The power supply and the safety locking circuit operate as follows.

The amplifier 18 delivers signals of duration $\underline{t}$ that varies (as a function of the difference between a fraction of the output voltage VS across the divider bridge 15 and the voltage VRef), and of period T that is fixed. The amplifier is electrically isolated from the secondary winding 144.

The output voltage VS across the divider bridge is related to the input voltage VC and to the ratio t/T as follows:

$$VS=VC \times t/T$$

When the switch 3 is closed (cover closed), the relay 17 is activated (closed), and the amplifier 18 delivers control signals to the transistor normally. The motor 2 is powered.

When the relay 17 is deactivated (opened) by the switch 3 opening (when the cover 4 is moved away from the base 5), the control signals output by the amplifier 18 are no longer transmitted to the transistor 16a, and therefore no longer reach the primary winding 141 of the transformer 14. The flux variation becomes zero, so that the secondary winding produces no voltage for the motor 2 (the potential at the base of the transistor 16a is fixed by resistor 16b).

If the transistor 16a is held on, the primary winding of the transformer carries current permanently (with the current through the primary winding being limited only by the resistance of the RC circuit). There is no flux variation, and therefore no voltage at the output of the secondary winding. If the transistor 16a is held off, there is no voltage at the output of the secondary winding either.

Such an approvable configuration makes sufficient output power available to power a plurality of control motors, while it is still possible for the power supply to be interrupted by a relay having low current-interrupting capability.

Naturally, in a variant, the chopper power supply may include a plurality of approved electromechanical relays associated with respective ones of a plurality of control power chopper circuits.

I claim:

1. A mail-processing machine including an electrical power supply for powering at least one control motor, and a safety locking circuit electrically connected to a cover switch of the machine and co-operating with the electrical power supply to switch the power supply off whenever the cover of the machine is open, said electrical power supply including a chopper electrical power supply comprising at least one power chopper circuit having a control circuit, and wherein the safety locking circuit includes at least one electromechanical relay electrically connecting the power chopper circuit to its control circuit.

2. A mail-processing machine as claimed in claim 1, wherein said at least one power chopper circuit further includes a transistor and a resistor connected to said at least one electromechanical relay.

3. A mail-processing machine as claimed in claim 2, wherein said at least one electromechanical relay includes a contact and a control coil which is coupled to the cover switch and controls opening and closing of the contact which electrically couples the transistor and resistor to the control circuit.

4. A mail-processing machine as claimed in claim 3, wherein said electrical power supply further includes a divider bridge which is coupled to said control circuit.

5. A mail-processing machine as claimed in claim 4, further comprising a reference voltage which is supplied to said control circuit, said control circuit outputting signals to said contact based on a voltage from said divider bridge and said reference voltage.

* * * * *